Sept. 30, 1930.　　　H. K. CLEMONS　　　1,777,164
EXCAVATING, LOADING, AND DUMPING DEVICE
Filed Jan. 29, 1927　　4 Sheets-Sheet 1
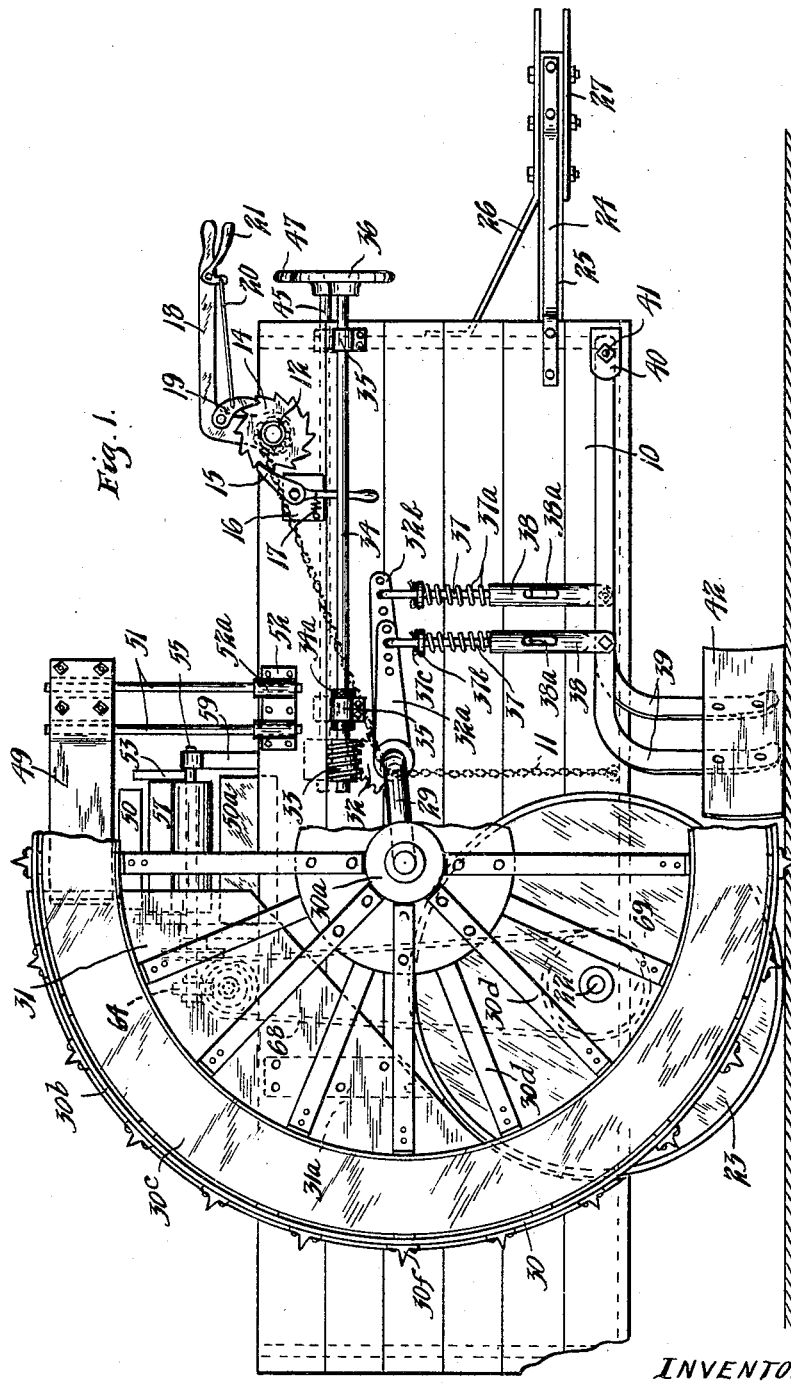
INVENTOR.
HARRY K. CLEMONS.
BY HIS ATTORNEYS

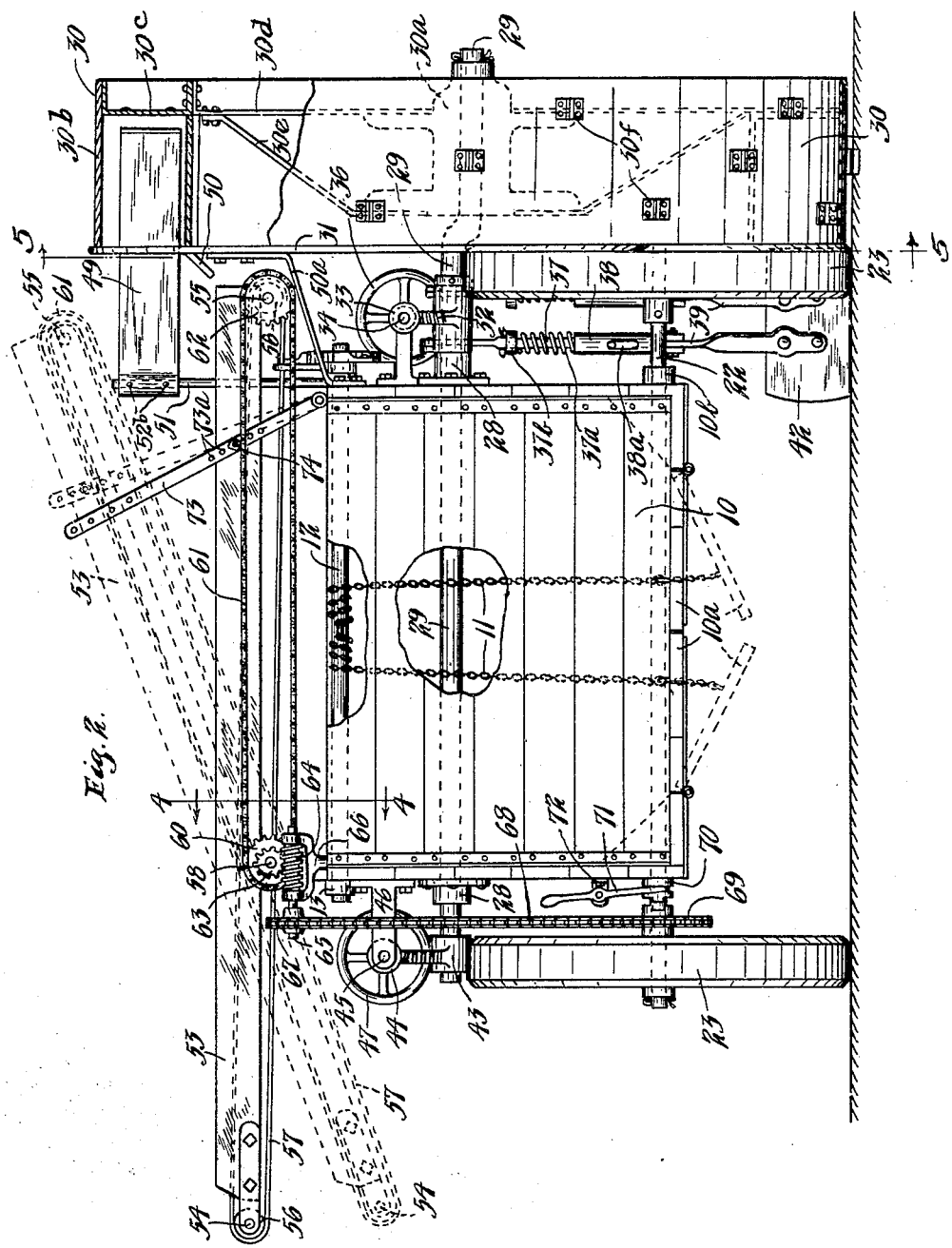

Sept. 30, 1930.         H. K. CLEMONS         1,777,164
           EXCAVATING, LOADING, AND DUMPING DEVICE
               Filed Jan. 29, 1927    4 Sheets-Sheet 3
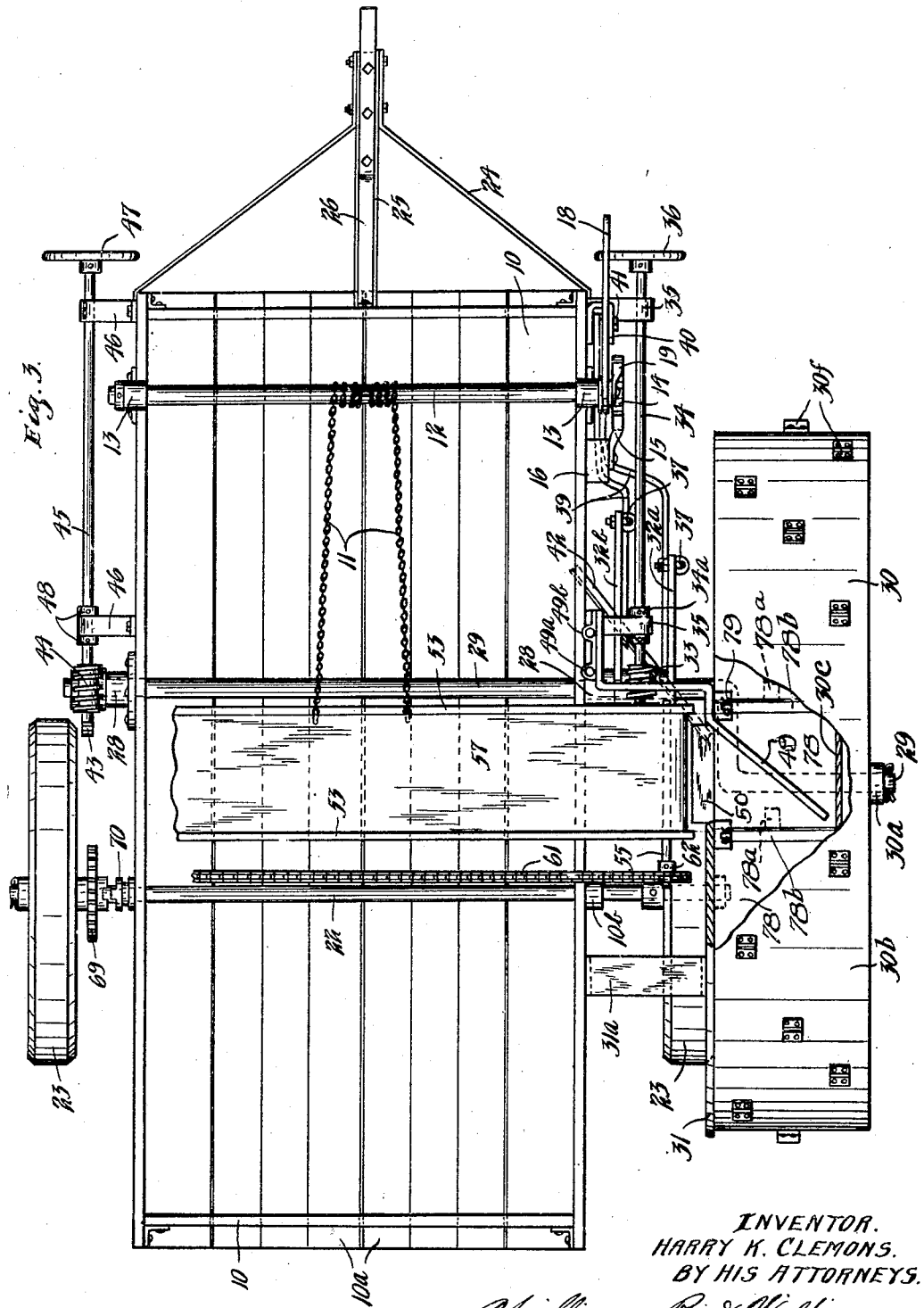
INVENTOR.
HARRY K. CLEMONS.
BY HIS ATTORNEYS.

Sept. 30, 1930.  H. K. CLEMONS  1,777,164
EXCAVATING, LOADING, AND DUMPING DEVICE
Filed Jan. 29, 1927  4 Sheets-Sheet 4
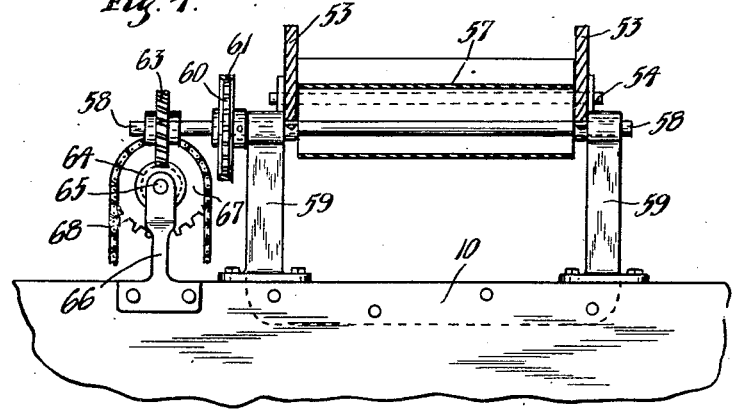
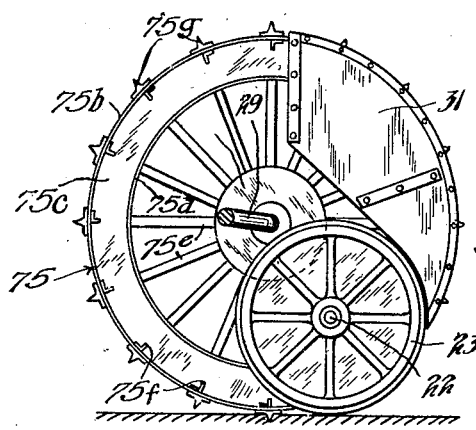
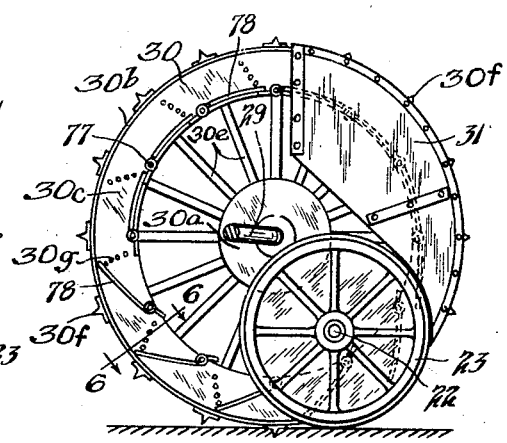
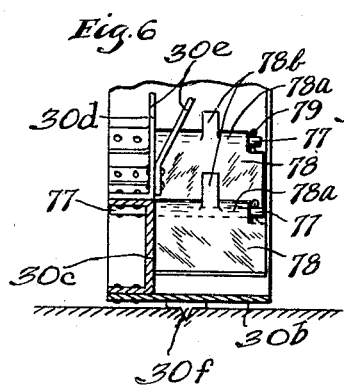
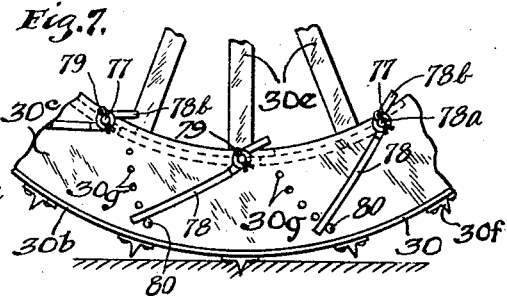
INVENTOR.
HARRY K. CLEMONS.
BY HIS ATTORNEYS.

Patented Sept. 30, 1930

1,777,164

UNITED STATES PATENT OFFICE

HARRY K. CLEMONS, OF ST. PAUL, MINNESOTA

EXCAVATING, LOADING, AND DUMPING DEVICE

Application filed January 29, 1927. Serial No. 164,470.

This invention relates to an excavating machine and particularly to such a machine adapted to be drawn along the ground and to excavate and elevate the material. It is desirable, at times, to excavate or scrape the material from the surface and simultaneously elevate and load the same so it can be transported.

It is an object of this invention, therefore, to provide an excavating and elevating device comprising a vehicle adapted to be drawn along the ground, having a dirt receiving body, a pair of supporting wheels, and an additional earth receiving and elevating wheel adapted to receive the earth and elevate the same so that said earth can be discharged into said body.

It is another object of the invention to provide an excavating and loading machine comprising a vehicle such as a truck or tractor adapted to be drawn along the ground, and having supporting wheels together with an earth receiving and elevating wheel whereby the earth can be discharged from said elevating wheel into a collecting means or be carried to one side of said vehicle to be loaded onto an adjacent member.

It is still another object of the invention to provide an excavating and elevating device comprising a vehicle adapted to be drawn along the ground, having a body and a pair of supporting wheels, and a depending earth receiving and elevating wheel adapted to be raised to an inoperative position and lowered into an operative position substantially in contact with the ground.

It is more specifically an object of the invention to provide an excavating, elevating and loading machine comprising a vehicle adapted to be drawn along the ground and having a body with supporting wheels, and having an additional earth receiving and elevating wheel together with means for delivering the earth from said wheel either into the body or onto a carrier which is disposed above the said body and extends transversely thereof.

It is also an object of the invention to provide an excavating and dirt elevating machine comprising a vehicle adapted to be drawn along the ground having a body, a pair of supporting wheels therefor, an earth elevating wheel disposed adjacent one of said supporting wheels whereby said supporting wheel assists said earth elevating wheel in its operation.

These and other objects and advantages of the invention will be fully set forth in the following description made in connection with the accompanying drawings, in which like reference characters refer to similar parts throughout the several views and in which:—

Fig. 1 is a view in side elevation of the device, a portion thereof being broken away;

Fig. 2 is a view in rear elevation of the device, a portion being broken away, other parts shown in vertical section, and a portion thereof shown in a different position in dotted lines;

Fig. 3 is a plan view of the device, certain portions being broken away and others shown in horizontal section;

Fig. 4 is a vertical section taken on line 4—4 of Fig. 2, as indicated by the arrows;

Fig. 5 is a vertical section taken on line 5—5 of Fig. 2, as indicated by the arrows;

Fig. 6 is a section taken on line 6—6 of Fig. 5, as indicated by the arrows;

Fig. 7 is a partial view similar to Fig. 5, shown on an enlarged scale; and

Fig. 8 is a view similar to Fig. 5, showing a modified form of the earth receiving and elevating wheel.

Referring to the drawings, a machine is shown comprising a vehicle having a body 10 having a bull wheel, a small wheel at the opposite side thereof and a second small wheel disposed inwardly of the bull wheel and rearwardly of the axis thereof. The bottom portion of the body 10 is equipped with hinged doors 10ª adapted to swing downward as shown in dotted lines in Fig. 2, so that the material can be dumped from said body. The doors 10ª have chains 11 connected thereto, which chains extend upwardly and forwardly to a shaft 12 to which they are connected, which shaft is journaled in bearings 13 at the sides of the body 10. The shaft 10 has secured thereto a ratchet wheel 14 and a hand lever pawl 15 is intermediately pivoted to a bracket 16 secured to the side of the body 10 and adapted to engage the teeth of the ratchet wheel 14 to prevent rotation of said wheel in a direction to let the doors 10ª drop. The pawl 15 is urged to position to engage wheel 14 by a small tension spring 17. A lever 18 is journaled on shaft 12 at one side of ratchet wheel 14, which lever is bent into substantially right-angled shape and has pivoted thereon a pawl 19 adapted to engage the teeth of wheel 14. The pawl 19 is connected by a link 20 to an operating grip handle 21 pivoted to the handle end of lever 18 whereby said pawl 19 may be disengaged from the wheel 14. The body 10 has bearings 10ᵇ intermediate its ends, in which is journaled an axle 22 having secured to its ends the operating wheels 23 for the body 10. The body 10 has secured thereto at its forward end converging bars 24 secured to a central member 25 and a top bar 26 is also secured to the front end of the body 10 and to the member 25. The bar 26 and a lower bar 27 project beyond the end of member 25 to form a clevis which constitutes the draft means for the body 10, by which it may be connected to a tractor or other traction means. The body 10 has bearing brackets 28 secured at each side thereof and an axle member 29 is disposed in said bearings and adapted to oscillate therein. The axle 29 is formed at one outer end shown at the right hand side of Fig. 2 with a crank portion on which portion is revolubly mounted a hub 30ª of an earth receiving and elevating wheel 30. The wheel 30 includes, among other parts, a circular rim 30ᵇ and secured to this rim adjacent the outer edge thereof to project toward the hub 30ª, is a circular channel member 30ᶜ. The wheel has outer and inner spokes 30ᵈ and 30ᵉ respectively, the outer spokes being bent substantially at right angles at their outer ends to be riveted to the inner flange of the channel member 30ᶜ, and being bolted at their inner ends to a flange extended from the hub 30ª. The inner spokes 30ᵉ are angularly bent at their outer ends and are secured to the outer ends of the outer spokes 30ᵈ and extend diagonally therefrom to be secured at their central ends to an inner circular flange extending from hub 30ª. The rim 30ᵇ has secured thereto on its outer side a plurality of cleat members 30ᶠ. A plurality of pins 77 riveted or otherwise secured to the outer side of the inner flange of channel member 30ᶜ project through the web of the channel member and extend inwardly therefrom. Plates 78 have hubs 78ª adjacent one end which are journaled on the pins 77 and held thereon by cotter pins 79. The plates 78 are of general arcuate curvature in the same curvature as the inner flange of the channel member 30ᶜ, and the plates have projections 78ᵇ at their inner ends offset somewhat from the axes of the pins 77. The plates are so spaced that the outer edges of the plates will engage with the projections 78ᵇ of adjacent plates when the plates swing inwardly, as shown in dotted lines Fig. 7. The channel member 30ᶜ has rows of holes 30ᵍ in the web thereof arranged concentrically relative to the various pins 77, and bolts 80 are adapted to be secured in any of these holes to limit the outward swinging movement of the plate 78. With this construction, it will be seen that the rim 30ᵇ, channel member 30ᶜ, and plates 78 form a channel in the wheel divided at points into a series of compartments by the plates 78. At least one of the wheels 23 is formed as a disk wheel and the disk of this wheel as shown at the right hand side of Fig. 2 is disposed closely adjacent the wheel 30 so that said disk of wheel 23 partly closes the said channel. A plate 31 is disposed at the inner side of the wheel 30 and as shown in Fig. 1, said plate is circular in outline, and substantially flush with the inner side of the rim 30ᵇ and has its lower edge closely approaching the periphery of the wheel 23, said inner edge extending from the wheel 23 diagonally upwardly and then extending vertically. The plate 31 is supported and braced from the body 10 by member 31ª. A plate 49 is provided, disposed at the top of the wheel 30 and adapted to have one end project into the channel formed in said wheel. Said plate is bent as shown in Fig. 3 and has another plate 49ª bolted thereto having spaced bosses or hubs 49ᵇ. Supporting rods 51 extend into the bosses 49ᵇ and are secured therein by suitable pins or set screws 52ᵇ. The rods 51 extend through bosses 52ª formed on a plate 52 which is secured to the side of the body 10. A chute or guide plate 50 is disposed beneath the plate 49 substantially flush with the plates 78 at the top of the wheel 30 and another chute or guide plate 50ª is disposed some distance below the plate 50 and the end of an endless conveyor to be later described, and extends downwardly and inwardly to the top of the body 10. The axle 29 has a gear segment 32 oscillatably mounted thereon adjacent one of the bearings 28 which is engaged by a worm gear 33 secured to shaft 34 journaled in bearings 35 secured to the side of body 10 and projecting forwardly to the front of said body, said shaft being equipped with a hand wheel 36 at its front end. The shaft 34 is kept from endwise movement by collars 34ª secured thereto at each side of one of the bearings 35. A pair of arms 32ª and 32ᵇ project forwardly from the member 32, each having a plurality of holes therethrough and the upper ends of rods 37 are formed as hooks adapted to project through any one of said holes. The rods 37 at their lower ends extend into socket members 38, said rods having their lower terminals bent at right angles to project laterally into slots 38ª formed in the sides of the members 38, said members 38 being pivotally connected at their lower ends respectively to a pair of bars or levers 39. Coiled compression springs 37ª surround the rods 37 having their lower ends engaging the tops of the members 38 and having their upper ends engaged by collars 37ᵇ disposed on rods 37 and held in position thereon by cotter pins 37ᶜ. The levers 39 converge at their forward ends and are received in a channel member 40 which is connected to the side of the body 10 by a headed and nutted bolt 41 passing therethrough and through the lever 39 so that said levers are pivoted on said bolt. The levers 39 are bent downward substantially at right angles at their rear ends and secured to the rear side of the scraping member or blade 42 which extends at an angle to the longitudinal axis of the machine as shown in Fig. 3, having its inner end forwardly. The axle 29 projects at one side of the body 10 and bearing 28 and has secured thereto a gear segment 43 engaged by a worm gear 44 carried on the shaft 45, which shaft is journaled in bearings 46 secured to one side of the body 10 and projects at the forward end of said body, where it has a hand wheel 47 secured thereto. Said shaft is prevented from endwise movement by collars 48 secured at each side of one of the bearings 46 as shown in Fig. 3. By turning hand wheel 47 the axle 29 is turned and the crank portion thereof will raise and lower the wheel 30.

An endless conveyor is provided, extending transversely of the body 10 and comprises a frame having the longitudinally extending members 53 at each side thereof having journaled therein shafts 54 and 55 having secured thereto rollers 56 over which runs a conveyor belt 57. It will be seen that the members 53 extend above the top run of belt 6, forming a trough. A shaft 58 extends transversely of the members 53 intermediate their ends and is disposed substantially above one of the sides of the body 10 being journaled in bearings 59 secured to said sides, the members 53 having portions journaled on said shaft. A sprocket 60 is secured to shaft 58 and a chain 61 runs over this sprocket and also over a sprocket 62 secured to the shaft 55. A worm wheel gear 63 is also secured to shaft 58 and meshes with the worm gear 64 secured to a shaft 65 journaled in the spaced bearings of a forked bracket 66 secured to the body 10, the worm gear 64 being disposed between the spaced bearings of said bracket. The shaft 65 has a sprocket wheel 67 secured at its outer end thereto and a chain 68 runs over a sprocket 67 and over a larger sprocket 69 journaled on axle 22 and disposed at one side of one of the wheels 23. The sprocket 69 is adapted to be clutched to the axle 22 to be driven thereby, and for this purpose is formed at one end as a half-clutch adapted to engage with a slidable half-clutch member 70 splined to the axle 22, member 70 having a groove therein engaged by the lower forked end of the shift lever 71 pivoted in the bracket 72 secured to the side of the body 10, the upper end of the lever 71 being formed as a handle and extending above bracket 72. The sprockets 69 can thus be connected to the axle so as to be driven thereby when desired. The endless carrier comprising the members 53 is oscillatable about the shaft 58 and said carrier is adapted to be held in various positions by a swinging arm 73 pivoted at one side of the body 10 and having therein a plurality of holes 73ª, a headed and nutted bolt 74 being adapted to pass through one of the members 53 and through any one of the holes 73ª.

In operation, when the device is used for excavating and elevating earth or dirt, the blade 42 will be brought to the proper position to scrape or excavate a layer of the desired thickness. This blade is adjusted in position by manipulation of the hand wheel 36 which oscillates the gear segment 32 and moves the levers 32ª. The end wheel 47 is thus manipulated to oscillate the crank shaft 29 by means of the worm gear 44 and gear segment 43. The wheel 30 is lowered so that its rim is substantially in contact with the ground, but slightly spaced from the surface thereof and so the cleats 30ᶠ will enter the ground and obtain strong traction effect thereon. If the elevated dirt is to be discharged into the vehicle body 10, the carrier comprising members 52 will be raised to the position shown in dotted lines in Fig. 2. The doors 10ª in the bottom of the body 10 will, of course, be closed and it will be noted that said doors can be moved to closed position by oscillating lever 18 so that pawl 19 successively engages the teeth of the ratchet wheel 14 and rotates shaft 12, thus winding up the chains 11. These chains, as shown in Fig. 1, pass over the crank shaft 29. The doors will be held in closed position and wheel 14 kept from reverse rotation by the pawl 15. The plates 78 below the center of the wheel 30 will be held by gravity in downwardly swung position across the channel in the wheel as best shown in Figs. 5, 6 and 7, so that the lower portion of the channel of the wheel will be divided into compartments.

The plates 78 above the center of the wheel will be held by gravity swung toward the center of the wheel so that adjacent plates 78 will contact each other to form a substantially closed arcuate partition in the wheel in centrally disposed relation from the upper half of the rim 30$^b$. The machine will be drawn along the ground by some traction means connected to the bars 26 and 27. The blade 42 will scrape up dirt which will be moved rearwardly and outwardly along said blade and the dirt will be raised somewhat and moved into the compartments formed by the plates 78 in the channel of the wheel. The earth moved into the wheel 30 will be carried by the rotation of the wheel upwardly, whereupon as the wheel progresses various upwardly moving plates, shortly after passing points about level with the center of the wheel, will drop to their inward positions to clear the plates from the upper portion of the wheel. It will be seen, as indicated by the arrows in Fig. 1, that the side of the wheel 23 which is closely adjacent the wheel 30 rotates in the same direction as wheel 30. The said wheel 23 will thus engage the earth in wheel 30 and will co-operate with said wheel and the blades 78 in the elevating operation and assist in the elevating of the earth.

It will be understood that wheel 30 will be moved by the contact with the ground of the cleats 30$^f$ therein, so that the lineal speed of the centers of said wheels 23 and 30 is the same. The earth in the wheel 30 would naturally tend to assume a certain angle of repose, but owing to the fact that the dirt is constantly moved into the wheel by the blade 42 and urged along with the wheel by the wheels 23, the dirt becomes packed in wheel 30 between the plates 78 and this causes the dirt to be moved upwardly in a more or less compact mass until the plates swing to their central positions whereupon the dirt in the lower part of the channel will force the dirt in the upper part thereof upwardly. After the dirt moves past the wheel 23, it comes opposite the plate 31 and is thus confined in the channel in wheel 30 until it reaches the top of said wheel. The dirt then is engaged by the scraper blade 49 which extends into the channel in wheel 30 and the dirt is moved out of the wheel by blade 49, so that it falls from the inside of channel and is guided by the plates 50 and 50$^a$ into the body 10 of the vehicle. It will be seen that the plates 78 will not interfere with the action of blade 49. This operation is continued until the desired amount of dirt has been collected in the vehicle. If it is desired then to transport the dirt to some other place for dumping, the hand wheel 47 will then again be manipulated to turn crank shaft 39 and elevate wheel 30, so that it is out of contact with the ground. The vehicle is then transported to the desired place and the dirt dumped from body 10 by opening af the doors 10$^a$. It will be noted that as the vehicle is drawn along the ground in operation, the blade 42 is held down yieldingly in proper position by the springs 37$^a$. This is desirable so the blade may raise and pass over any obstruction such as a hard rock in the ground.

If it is desired to load the dirt elevated into another vehicle, the endless conveyor including members 53 will be moved to the position shown in full lines in Fig. 2. It will be seen that the blade 49 clears the endless carrier so that the latter can be moved as clearly shown in Fig. 3. When the endless carrier is in the position shown in full lines in Fig. 2, the dirt or earth from wheel 30 will be moved by the scraper blade 49 and will be discharged from the plate 50 onto the endless carrier and moved thereby to one side of the vehicle. The endless carrier will be driven through chain 68, sprocket 69 being connected to axle 22 as already described.

The amount of dirt that is elevated by the wheel 30 may be varied by placing the bolts 80 in various openings 30$^g$ in the channel member 30$^c$. The bolts 80 act to limit the distance that the plates 78 will be carried across the channel in the wheel as the lower portions of the plates fall by gravity downwardly during rotation of the wheel, and, accordingly, the position of the plates 78 as determined by the stop bolts 80 will largely determine the amount of dirt that will be carried into the channel of the wheel by means of the excavating tool 42.

In Fig. 8, another form of elevating wheel is shown. This wheel which is designated generally as 75, includes a hub portion 75$^a$, a rim 75$^b$, a centrally projecting flange 75$^c$ adjacent the outer edge of the wheel, a circular flange 75$^d$ concentric with the rim and extending from the flange 75$^c$ to the inner edge of the wheel, and outer and inner spokes 75$^e$ extending respectively from the flange 75$^c$ and 75$^d$ to spaced flanges on the hub 75$^a$. On the central side of the rim 75$^b$, there are secured angular lugs 75$^f$, while on the outside of the rim there are secured cleats 76 corresponding to the cleat members 30$^f$. It will be seen that the wheel illustrated in Fig. 8 is very similar in all respects to the wheel 30 with the exception that the flange 75$^d$ and lugs 75$^f$ are substituted for the plates 78 and pins 77. The wheel 75 will be mounted on the crank shaft 29 and disposed adjacent one of the wheels 23 and plate 31 in the same manner that the wheel 30 is mounted and disposed.

When the wheel 75 is used, the blade 42 will move the dirt into the channel formed by the rim 75$^b$, flange 75$^c$ and flange 75$^d$. As the wheel 75 rotates, the dirt will be carried upwardly by the wheel and discharged therefrom by the blade 49. The lugs 75$^f$ will assist in the raising action as will the closed side of the adjacent moving load bearing wheel 23 and the packing of the dirt in the channel of the wheel. While in the embodiment of the invention illustrated, the elevating wheel and carrier are shown mounted on a vehicle of the cart type, one wheel of which is used to operate the carrier or conveyor, it will be understood that with slight modifications the elevating wheel and carrier could also be readily attached to and used with a great variety of similar vehicles such as various trucks, dump wagons, tractors and the like. This adaptability is largely due to the mounting of the elevating wheel and the ease with which this elevating wheel and mechanism can be thrown into operative and inoperative positions. Obviously, such adaptations as above mentioned are within the scope of this invention.

Further, while in the embodiment of the invention illustrated a scraping blade is used for excavating or scraping the material into the elevating wheel, the invention contemplates the use of any of the many well known excavating or material handling devices for this purpose such as disk or mold board plows and scraping blades set at various angles. It is obvious that several scraping blades could be used and the material scraped from the outer side of the wheel into position to enter the wheel and that material could be moved or loaded into the elevating wheel by sweeping brooms.

It is also obvious that while in the embodiment of the invention illustrated, the endless carrier extends transversely of the vehicle, the said carrier could extend in other directions and could, if desired, be made to extend parallel with the elevating wheel and deliver the material forwardly or rearwardly of the line of travel, such arrangements being within the purview of this invention.

From the above description it is seen that applicant has provided a novel and efficient dirt excavating and elevating apparatus and one in which the dirt is simultaneously loaded for transportation either in the body of the vehicle forming part of the machine or in another vehicle moving alongside thereof. The excavating, loading and transporting of the earth is therefore carried on as one simultaneous operation and the separate loading operation is eliminated. The parts of the machine are comparatively few and the same are easily made and assembled. The machine is quite rugged in construction and able to withstand the rugged use to which the machine is put.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:—

1. In a machine of the class described, a vehicle having a body and adapted to be drawn along the ground, an adjustable excavating tool carried by said vehicle, a pair of supporting wheels for said vehicle, and an earth receiving and elevating wheel closely adjacent the outer side of one of said supporting wheels disposed to receive earth moved by said tool one of said supporting wheels having a flat side forming a closure for said elevating wheel.

2. In a machine of the class described, a vehicle having a body and adapted to be drawn along the ground, an excavating tool carried by said vehicle, a crank shaft oscillatably mounted in and extending transversely of said body, an elevating wheel adapted to receive and elevate earth delivered by said tool mounted on the crank portion of said shaft, and means for oscillating said shaft to raise and lower said elevating wheel and supporting wheels for said vehicle supporting said elevating wheel.

3. In a machine of the class described, an earth receiving and elevating wheel having an imperforate rim, an annular plate extending inward from said rim substantially at right angles thereto, and a plurality of swinging pivoted plates pivoted on axes extending parallel to said rim and inwardly thereof, said plates being adapted to swing inward and form in part a continuous annular flange about said wheel spaced inwardly from said rim.

4. The structure set forth in claim 3, said plates having portions projecting at one side of their pivots adapted to be engaged by the next adjacent plate when said plates are in their inward position.

5. The structure set forth in claim 3, and means for limiting the outward swinging movements of said plates.

6. In a machine of the class described, a vehicle having a body capable of being drawn along the ground, a ground working tool attached to said body, an elevating wheel operative at one side of said body, said wheel having an outer bearing rim and a variable inner rim, said rims forming a groove to receive and elevate material delivered into same by said tool.

7. In a machine of the class described having a body capable of being drawn along the ground, a ground working tool attached to said body, an elevating wheel operative at one side of said body, said elevating wheel having an outer flanged bearing rim and an inner rim comprising segmental oscillating members, said rims forming a pocket to receive material from said tool and elevate the same.

8. In a machine of the class described having a body capable of being drawn along the ground, supporting wheels for the same, an elevating wheel operative on one side of said body, said elevating wheel having an outer flanged rim and an inner rim including segmental oscillating members, said rims forming a groove to receive material from said tool and elevate the same, scraping means for clearing material from the surface of said inner rim at a determined point in the circumference thereof.

9. In a machine of the class described having a body capable of being drawn along the ground, supporting wheels for the same, a rotatively mounted and vertically adjustable elevating wheel operative on one side of said body, said elevating wheel having an outer flanged rim and an inner rim including segmental oscillating members, said rims forming a groove to receive material from said tool and elevate the same, scraping means for clearing material from the surface of said inner rim at a determined point in the circumference thereof.

10. In a machine of the class described having a body capable of being drawn along the ground, supporting wheels for the same, an elevating wheel operative on one side of said body, said elevating wheel having an outer flanged rim and an inner rim including segmental oscillating members, said rims forming a groove to receive material from said tool and elevate the same, means disposed in close proximity to the inner side of said elevating wheel to prevent wastage of material therefrom, scraping means for clearing material from the surface of said inner rim at a determined point in the circumference thereof.

11. In a machine of the class described having a body capable of being drawn along the ground, supporting wheels for the same, an elevating wheel operative on one side of said body, said elevating wheel having an outer flanged rim and an inner rim including segmental oscillating members, said rims forming a groove to receive material from said tool and elevate the same, scraping means for clearing material from the surface of said inner rim at a determined point in the circumference thereof, and means for receiving and conveying material scraped from the elevating wheel.

12. In a machine of the class described, having a body capable of being drawn along the ground, supporting wheels for the same, an elevating wheel operative on one side of said body, a ground working tool attached to said body, said elevating wheel having an outer flanged rim, an inner rim of segmental oscillating pivoted members, said rims forming a pocket to receive material from said tool and elevate the same, a scraping member entering into said pocket and clearing the folded segmental parts of said inner rim of material, mechanically driven conveyor means for receiving said material delivered from said elevator wheel and conveying said material therefrom.

13. In a machine of the class described, a vehicle having a body and adapted to be drawn along the ground, supporting wheels for said vehicle, a material receiving and elevating wheel at one side of said vehicle, an excavating tool carried by said vehicle adapted to move dirt into said elevating wheel, a shaft carried by said vehicle body, an arm journaled on said shaft, means adjustably connected to said arm and connected to said excavating tool, and means for varying the position of said arm and holding the same in position with said tool in different positions.

14. In a machine of the class described, a vehicle having a body and adapted to be drawn along the ground, supporting wheels for said vehicle, a material receiving and elevating wheel at one side of said vehicle, an excavating tool carried by said vehicle adapted to move dirt into said elevating wheel, a pivoted arm carrying said tool, an angularly adjustable arm carried by said body, yielding and extensible means connecting said arm and said pivoted arm, and means for moving said angularly adjustable arm and holding the same in fixed position.

15. In a machine of the class described, a vehicle having a body and adapted to be drawn along the ground, an excavating tool carried by said vehicle, supporting wheels for said vehicle, and a material receiving and elevating wheel at one side of said vehicle, said excavating tool being adapted to direct material into said elevating wheel, one of said supporting wheels being disposed closely adjacent the inner side of said elevating wheel and co-operating therewith in the elevation of the material.

16. A machine of the class described, a vehicle comprising a body adapted to receive excavated material, supporting wheels for said vehicle, an excavating tool carried by said body, spaced bearings carried by said body at opposite sides thereof, a shaft journaled in said bearings having a crank portion at one end, an elevating wheel journaled on said crank portion and supported thereby at one side of said body, and means for rotating said shaft to raise and lower said elevating wheel.

17. A machine of the class described, comprising a vehicle having a body for receiving material and adapted to be drawn along the ground, an excavating tool carried by said vehicle, a pair of supporting wheels for said vehicle at each side of said body respectively, an elevating wheel at one side of said body adapted to receive and elevate earth moved by said tool and supported by said supporting wheels, an axle for said supporting wheels having a crank portion on one end, on which said elevating wheel is mounted and means rotating said axle for raising said elevating wheel to an inoperative position when material is to be transported in said body and for moving said elevating wheel downwardly substantially to contact with the ground for elevating material.

In testimony whereof I affix my signature.

HARRY K. CLEMONS.